US006135315A

United States Patent [19]

[11] Patent Number: 6,135,315
[45] Date of Patent: Oct. 24, 2000

Gremillion, III et al.

[54] METHOD FOR DISPENSING INDIVIDUAL COPIES OF A PRINTED PUBLICATION FROM A STACK

[75] Inventors: Jack Paul Faustin Gremillion, III, Baton Rouge; Edward R. Roshto, French Settlement, both of La.

[73] Assignee: Jack P. F. Gremillion, III, Baton Rouge, La.

[21] Appl. No.: 08/968,954

[22] Filed: Nov. 12, 1997

[51] Int. Cl.[7] .......... B65G 59/00

[52] U.S. Cl. .......... 221/259; 221/258; 221/154; 221/155; 221/257

[58] Field of Search .......... 221/28, 154, 155, 221/213, 227, 241, 304, 259

[56] References Cited

U.S. PATENT DOCUMENTS

| | | | |
|---|---|---|---|
| 2,929,480 | 3/1960 | Black | 194/4 |
| 2,984,326 | 5/1961 | Westphal | 194/59 |
| 3,747,733 | 7/1973 | Knickerbocker | 194/10 |
| 3,946,846 | 3/1976 | Pepiciello et al. | 194/1 |
| 4,106,609 | 8/1978 | Kaspar | 194/1 |
| 4,273,255 | 6/1981 | Overall | 221/213 |
| 4,331,261 | 5/1982 | Brown | 221/232 |
| 4,655,369 | 4/1987 | Gabriel | 221/213 |
| 4,659,461 | 4/1987 | Orr | 221/227 X |
| 4,781,305 | 11/1988 | Carberry | 221/23 |
| 5,018,614 | 5/1991 | Ruckert | 194/236 |
| 5,046,641 | 9/1991 | Gray | 221/253 |
| 5,150,818 | 9/1992 | DeMoss | 221/228 |
| 5,244,115 | 9/1993 | Huck | 221/231 |
| 5,248,060 | 9/1993 | Friedman et al. | 221/28 |
| 5,373,963 | 12/1994 | Hsu | 221/155 X |

OTHER PUBLICATIONS

Affadavit of Jack Paul Faustin Gremillion, III, Jul. 1999.

*Primary Examiner*—Christopher P. Ellis
*Assistant Examiner*—Gene O. Crawford
*Attorney, Agent, or Firm*—Roy Kiesel & Tucker; Lance A. Foster; William David Kiesel

[57] ABSTRACT

A method for converting a multiple access newspaper vending machine into a single vend machine is described. The vending machine will have a cavity with a rack assembly for holding a stack of newspapers and a pivoting door for closing the cavity. The conversion includes mounting into the cavity of the vending machine a feed assembly which has a bracket and a roller member rotatably mounted to the bracket. The feed assembly rests within the cavity above the rack assembly in a manner such that the bracket pivots within the cavity and the roller member floats on the top copy of the stack of printed publications. A drive assembly having an unidirectional drive mechanism and a reset mechanism is also positioned within the cavity. A plate member having a publication discharge portal with dimensions sufficient to allow discharge therethrough of a single copy of the printed publication is positioned across the opening of the cavity. The discharge portal is aligned with the top copy of the stack and the pivoting door is operable to seal access to the discharge portal. The unidirectional drive mechanism is linked to the pivoting door member and the roller member such that opening the pivoting door will cause the roller member to rotate and propel the top copy on the stack through the discharge portal. Also described is an apparatus for dispensing an individual copy of a printed publication from a stack.

16 Claims, 8 Drawing Sheets

METHOD FOR DISPENSING INDIVIDUAL COPIES OF A PRINTED PUBLICATION FROM A STACK

TECHNICAL FIELD

This invention relates generally to methods and devices for dispensing copies of printed publications and more particularly to methods and devices for dispensing a single copy of the printed publication from a stack.

BACKGROUND ART

Theft is a continual problem with door type newspaper vending machines which offer access to the entire quantity of copies present within the machine. The thefts generally occur from customers who deposit the amount required for the purchase of one copy and take more than the quantity purchased. In some areas, thefts from these types of vending machines can be so high that vending machines cannot be used.

To counteract this problem there have been many attempts to develop methods and devices for dispensing a single copy. Because of the varying size of the publication from day to day, these machines are often complicated, expensive and difficult to maintain.

It would be a benefit, therefore, to have a printed publication dispensing device which is economical and simple to maintain.

Furthermore, it would also be beneficial to convert the existing quantity of multiple access machines to individual access machines at a minimum cost and with reliable results.

GENERAL SUMMARY DISCUSSION OF INVENTION

In general, the present invention provides a device and method for dispensing single copies of a printed publication from a stack containing multiple copies of the publication. Another aspect of the present invention provides a method of converting multiple access vending machines into single access devices. It is, therefore, an object of this invention to provide a method of converting a printed publication dispensing device into a dispensing device which dispenses individual copies of the printed publication.

It is another object of this invention to provide a printed publication dispensing device which will dispense individual copies of the printed publication from a stack.

It is another object of this invention to provide a method of dispensing individual copies of a printed publication from a stack containing multiple copies of the publication.

Accordingly a method for converting a multiple access printed publication into a single access dispensing device is described. The multiple access printed publication dispensing device to be converted is of the type which comprises:

a) a housing having a cavity in connection with a dispensing opening;

b) a door member pivotally attached to the housing in a manner to selectively allow access to the cavity through the dispensing opening; and c) a positioning assembly within the cavity having a rack assembly supported by a biasing means for supporting a stack of the printed publications in a manner such that a top copy of the stack is positioned into substantially the same position within the cavity as each successive top copy is removed;

into a dispensing device which allows access to only one of the copies in the stack at a time is described.

The conversion method comprises the steps of: a) providing a feed assembly comprising: a bracket, and a roller member rotatably mounted to the bracket; b) providing a drive assembly comprising: a unidirectional drive mechanism and a reset mechanism; c) providing a plate member having a publication discharge portal having dimensions sufficient to allow discharge of a single copy of the printed publication therethrough; d) mounting the feed assembly within the cavity above the rack assembly in a manner such that the bracket pivots within the cavity and the roller member floats on the top copy of the stack of printed publications; e) mounting the drive assembly within the cavity; f) installing the plate member across the dispensing opening in a manner such that the discharge portal is aligned with the top copy of the stack and the pivoting door member is operable to seal access to the discharge portal; g) linking the unidirectional drive mechanism to the pivoting door member; h) linking the unidirectional drive mechanism to the roller member; and, i) adjusting the reset mechanism to reset the unidirectional drive mechanism when the pivoting door member is closed.

The term "feed assembly" as used herein means a device that includes a movable frictional surface for contacting the top copy of a stack of printed publications and urging the top copy in the direction of a discharge port. The term "roller member" as used herein means a member in connection with the frictional surface of the feed assembly which transmits a force to the frictional surface for urging the top copy in the direction of a discharge port. The term "unidirectional drive mechanism" as used herein means a coupling device placed between the feed assembly and the mechanism supplying the force to the feed assembly which restricts the force to one direction to the feed assembly and which controls the cycling distance of the feed assembly. This would include mechanical, electromechanical or electronic devices actuated by mechanical, electromechanical, electronic, or a electromagnetic device such as a credit card reader. The term "cycling distanced" is used herein to mean the distance which the feed assembly is permitted to move the top copy. The term "reset mechanism" as used herein means a mechanism in mechanical connection with the unidirectional drive mechanism that resets the cycling distance to zero.

In a preferred embodiment of the conversion method, the link between the unidirectional drive mechanism and the pivotal door member comprises a flexible member having one end attachable to the pivotal door member.

In another preferred embodiment of the conversion method, the unidirectional drive mechanism comprises a first and second gear member, one of the gear members being rotatable in only one direction.

In another preferred embodiment of the conversion method, the link between the unidirectional drive mechanism and the pivotal door member comprises a flexible member having one end attachable to the pivotal door member, and the unidirectional drive mechanism comprises a first and second gear member, the first and second gear members having meshable teeth, the first gear member turns in only one direction. In this preferred embodiment the flexible member may include a second end in operable mechanical connection with one of the gear members in a manner to cause both of the gear members to rotate when the flexible member is under tensional force. The term "operable mechanical connection" is used herein to mean either direct or intermediate mechanical connections.

In another preferred embodiment of the conversion method, the reset mechanism includes a biasing means for biasing the meshable teeth of the first and second gear members into a normally meshed relationship, and a lever means, in mechanical linkage with one of the gear members, for overcoming the biasing means and forcing the meshable teeth of the first and second gear members out of the normally meshed relationship.

In another preferred embodiment of the conversion method, the reset mechanism further includes a rewind mechanism linked to the second gear member for causing the second gear member to return to a predetermined reset position when the meshable teeth of the first and second gear members are forced out of the normally meshed relationship. The rewind mechanism may include any type of forced storage mechanism such as weights, springs etc. It is preferred that the rewind mechanism include a spring.

In another preferred embodiment of the conversion method, the steps of: i) providing an anti-curl means for preventing the top copy from curling in response to the rotation of the roller member when the roller member is urging the top copy toward the discharge portal; and ii) positioning the anti-curl means into contact with the top copy are also performed.

A dispensing device for dispensing individual copies of a printed publication from a stack is also described. The dispensing device comprises: a) a housing having a cavity in connection with an opening of sufficient size to allow placement of a stack of printed publications within the cavity; b) a door member attached to the housing in a manner to selectively allow access to the cavity through the opening; c) a positioning assembly within the cavity having a rack assembly supported by a biasing means for supporting a stack of the printed publications in a manner such that a top copy in the stack is positioned into a predetermined position within the cavity as each successive top copy is removed; d) a feed assembly comprising a bracket and a roller member within the cavity, the roller member being rotatably mounted to the bracket; e) a drive assembly comprising a unidirectional drive mechanism and a reset mechanism; the unidirectional drive mechanism being in mechanical connection with the roller member, the reset mechanism being in mechanical connection with the unidirectional drive mechanism. The housing also includes a publication discharge portal, in alignment with the predetermined position of the top copy, having dimensions sufficient to allow discharge of a single copy of the printed publication therethrough. The feed assembly is mounted within the cavity above the rack assembly in a manner such that the bracket pivots within the cavity and the roller member floats on the top copy of the printed publication. The feed assembly is aligned in a manner such that the roller member urges the top copy toward the discharge portal when rotated.

In a preferred embodiment of the dispensing device the unidirectional drive mechanism comprises a first and second gear member. One of the gear members turns in only one direction.

In another preferred embodiment of the dispensing device, the dispensing device further includes a means, in contact with the top copy, for preventing the top copy from curling in response to the rotation of the roller member when the roller member is urging the top copy toward the publication discharge portal. The anti-curl means may include any device that is positionable into contact with the top copy of the stack and which will minimize or prevent the top copy from curling when a force from the roller member urges the top copy toward the publication discharge portal. The anti-curl means may be mounted in any manner within the cavity, however, it is preferred to slidably mount the anti-curl means into a track installed within the cavity.

Also provided is a method of dispensing an individual copy of a printed publication having a heel portion, from a stack containing a plurality of the individual copies. The term "heel portion" is used herein to refer to the edge comprising the folded sides of the newspaper sections. One step in the dispensing method comprises: a) providing a dispensing device comprising: i) a housing having a cavity in connection with an opening of sufficient size to allow placement of a stack of printed publications within the cavity; ii) a door member attached to the housing in a manner to selectively allowing access to the cavity through the opening; iii) a positioning assembly within the cavity having a rack assembly supported by a biasing means for supporting a stack of the printed publications in a manner such that a top copy of the stack is positioned into a predetermined position within the cavity as each successive top copy is removed; iv) a feed assembly comprising a bracket and a roller member within the cavity, the roller member being rotatably mounted to the bracket; v) a drive assembly comprising a unidirectional drive mechanism and a reset mechanism; the unidirectional drive mechanism being in mechanical connection with the roller member, and the reset mechanism being in mechanical connection with the unidirectional drive mechanism. The housing also includes a publication discharge portal, in alignment with the predetermined position of the top copy, having dimensions sufficient to allow discharge of a single copy of the printed publication therethrough. The feed assembly is mounted within the cavity above the rack plate of the positioning assembly in a manner such that the bracket pivots within the cavity. In use, the roller member floats on the top copy of the printed publication. The feed assembly is aligned in a manner such that the roller member urges the top copy toward the discharge portal when rotated The dispensing method also comprises the steps of: a) positioning a stack of printed publications onto the rack assembly in a manner such that the heel portion is positioned away from the publication discharge portal; and b) operating the drive assembly in a manner such that the roller member urges a top copy from the stack at least partially out of the cavity through the publication discharge portal.

In a preferred dispensing method the dispensing device provided further includes an anti-curl means, positionable into contact with the top copy, for preventing the top copy from curling in response to the rotation of the roller member when the roller member is urging the top copy toward the publication discharge portal, and the method further includes the step of positioning the anti-curl means into contact with the top copy.

In another preferred dispensing method the anti-curl means is positioned into contact with the heel portion of the top copy. It is also preferred to place a non-skid surface at the edge of the rack plate that is farthest from the publication discharge portal in a manner to contact the edge of the bottom copy of the stack. This aids dispensing when only a few copies are left in the stack.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
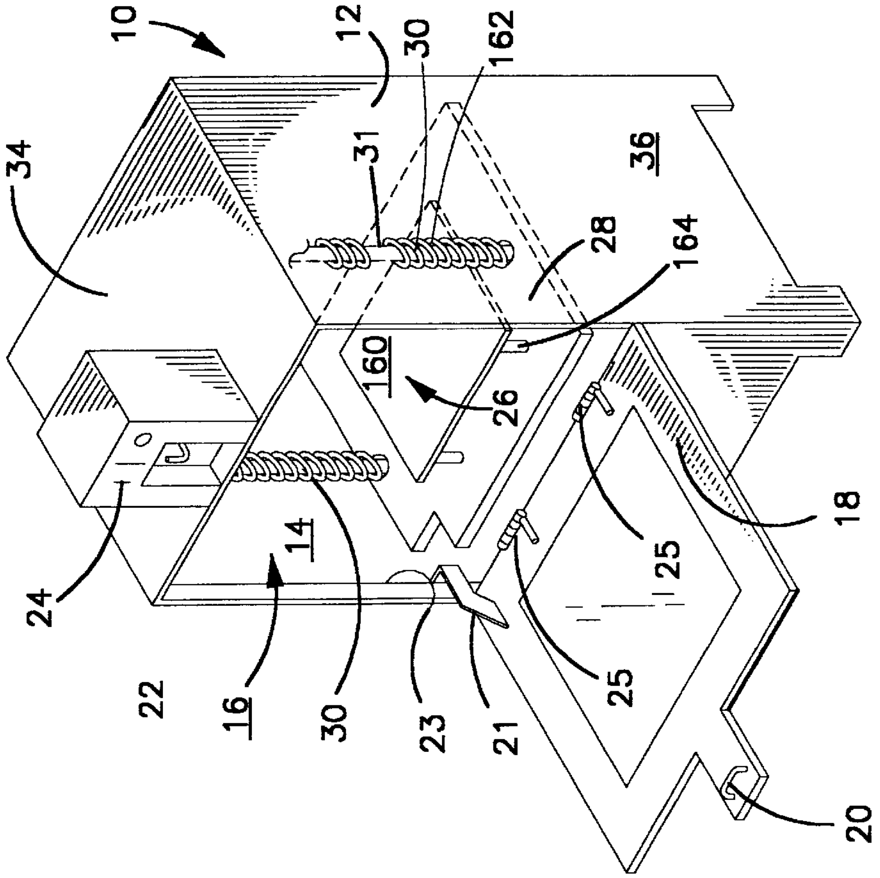
FIG. 1 is a perspective view of a typical multi-access vending machine.

FIG. 1 shows a typical, multiple access vending machine (MAVM) 10 of the type which may be converted into a single access vending machine by the conversion method of the present invention. MAVMs generally include an outer housing 12 which forms a storage cavity 14. The storage cavity 14 is accessed through a vending opening 16. Within the storage cavity 14 is a positioning assembly 26. The positioning assembly 26 includes a rack assembly 28 and two positioning springs 30. While FIG. 1 illustrates an inclined feed plate 160 positioned on rack assembly 28, inclined feed plate 160 is not part of a conventional MAVM, but rather is part of the present invention which will be explained in greater detail below. The positioning springs 30 are connected between the top 32 of rack assembly 28 and a top, interior surface 34 of the storage cavity 14. Positioned inside of springs 30 will be guide rods 31 which are also connected to the top, interior surface 34 of storage cavity 14. Guide rods 31 extend through rack assembly 28 such that rack assembly 28 may slide in the vertical direction on guide rods 31. When a stack of newspapers is placed on rack assembly 28, the additional weight on rack assembly 28 causes the positioning springs 30 to expand and the rack assembly 28 to descend on guide rods 31 toward the bottom 36 of storage cavity 14. Because the weight of the stack decreases as each top copy is removed, rack assembly 28 moves upward as each top copy is removed. Thus, the top copy of the stack of newspapers is positioned at a convenient and predetermined location within storage cavity 14.

The vending opening 16 is sealable by a hinged door member 18. The door member 18 includes a door stop 21 that contacts the inner lip 23 of housing 12 that defines vending opening 16. The door member 18 also includes a catch member 20 that engages a hook member 22, and two closing springs 25 that urge the door member 18 into the closed position. The hook member 22 is linked to a coin mechanism 24 or other payment verification device such as a currency or debit card reader. When the door member 18 is pivoted toward the closed position, catch member 20 engages hook member 22 and prevents door member 18 from moving into the open position. Closing springs 25 then urge door member 18 into a fully closed position with door member 18 in contact with the inner lip 23 of housing 12. Once hook member 22 and catch member 20 are engaged, the hook member 22 is disengageable from catch member 20 once for each deposit of the predetermined number of coins into coin mechanism 24.

Purchase of a newspaper is accomplished by depositing a predetermined number of coins into the coin mechanism 24, opening the door member 18, and removing a newspaper from the stack positioned on the rack assembly 28. As is readily apparent, vending newspapers by this method allows each customer access to all the newspapers within storage cavity 14.

Figure 2:
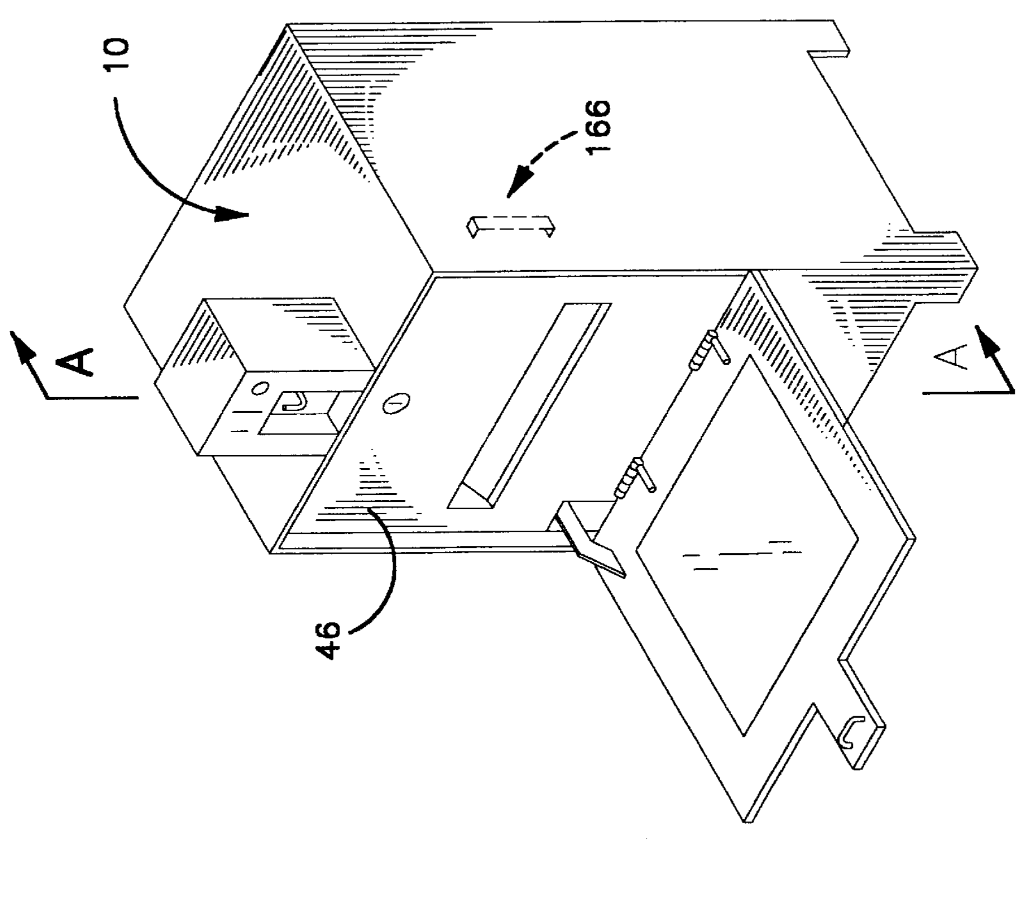
FIG. 2 is a perspective view of the exterior of a typical multi-access vending machine after an embodiment of the invention has been installed.

The method of converting the MAVM into a single vend dispensing device comprises the steps of providing a feed assembly, a drive assembly, and a plate member. During operation of the single vend dispensing device, the feed assembly engages the top copy of the stack located on rack assembly 28. The drive mechanism is connected to the feed assembly and provides the rotational force to the feed assembly in a direction to urge the top copy engaged by the feed assembly from storage cavity 14. The plate member is installed over vending opening 16 and includes a vending chute to provide a path for the top copy from the stack to exit storage cavity 14. FIG. 2 shows the exterior of the MAVM 10 of FIG. 1 after the method of converting the MAVM into a single vend dispensing device has been performed. In this view, only plate member 46 is visible.

Figure 3:
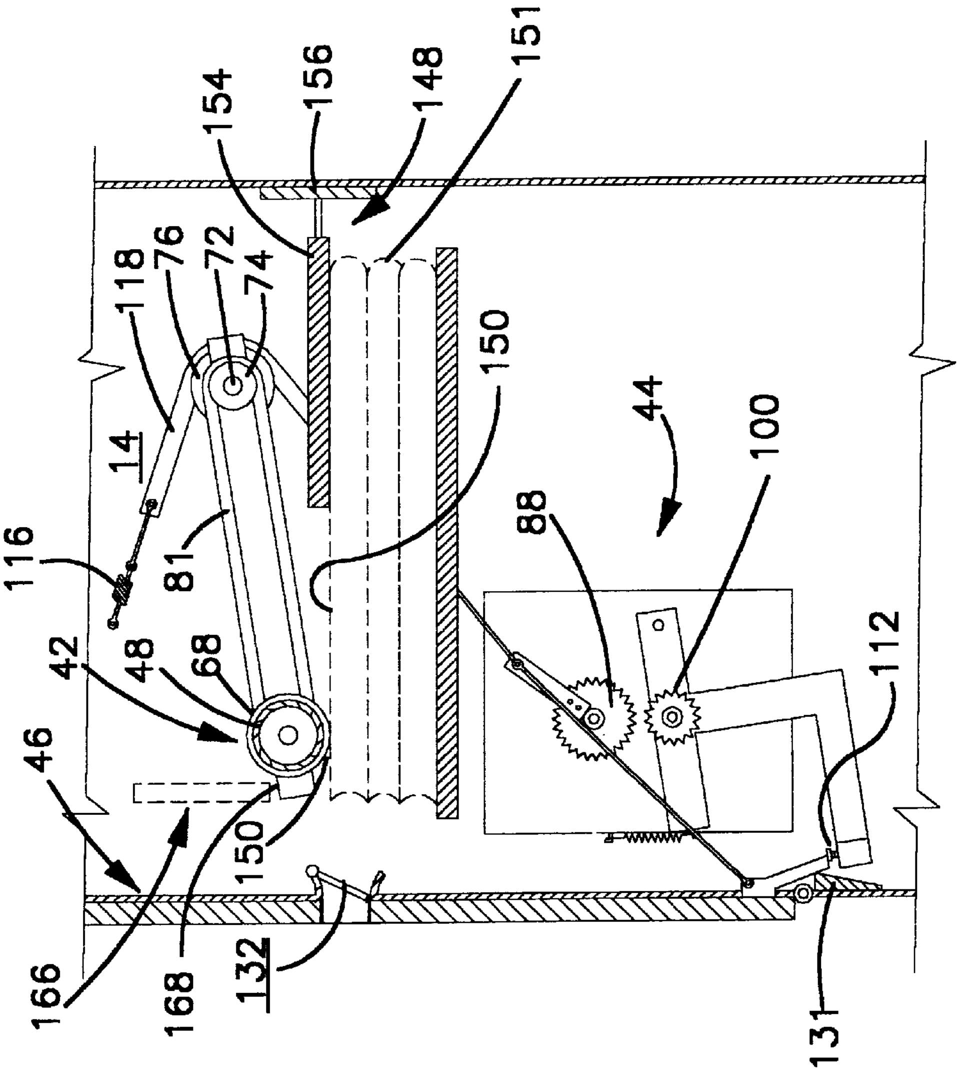
FIG. 3 is a cross-sectional view of the converted vending machine of FIG. 2 along the line A—A showing the converted vending machine in the reset condition.
Figure 3A:
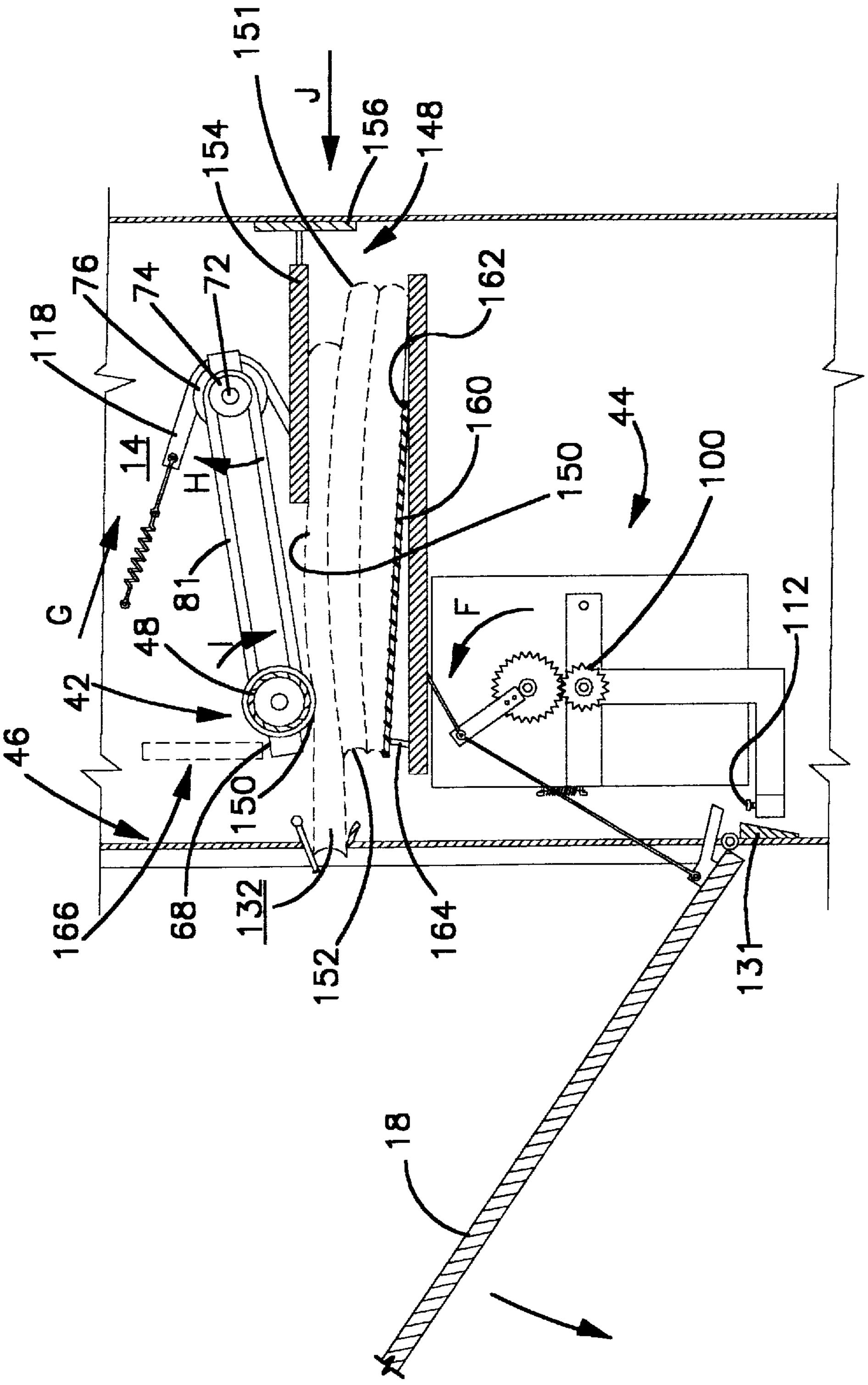
FIG. 3A is a cross-sectional view of the converted vending machine of FIG. 2 along the line A—A showing the converted vending machine midway through the vending cycle.

FIGS. 3 and 3A are cross-sectional views of the vending machine of FIG. 2 along the line A—A. The figures show partial views of feed assembly 42 and drive assembly 44 more clearly. Operation of the MAVM converted by this embodiment of the conversion method of the invention will be discussed with reference to FIGS. 3 and 3A in more detail below after describing in more detail embodiments of the feed assembly 42, drive assembly 44, and plate member 46 provided in the method.

Figures 4, 5, 6:
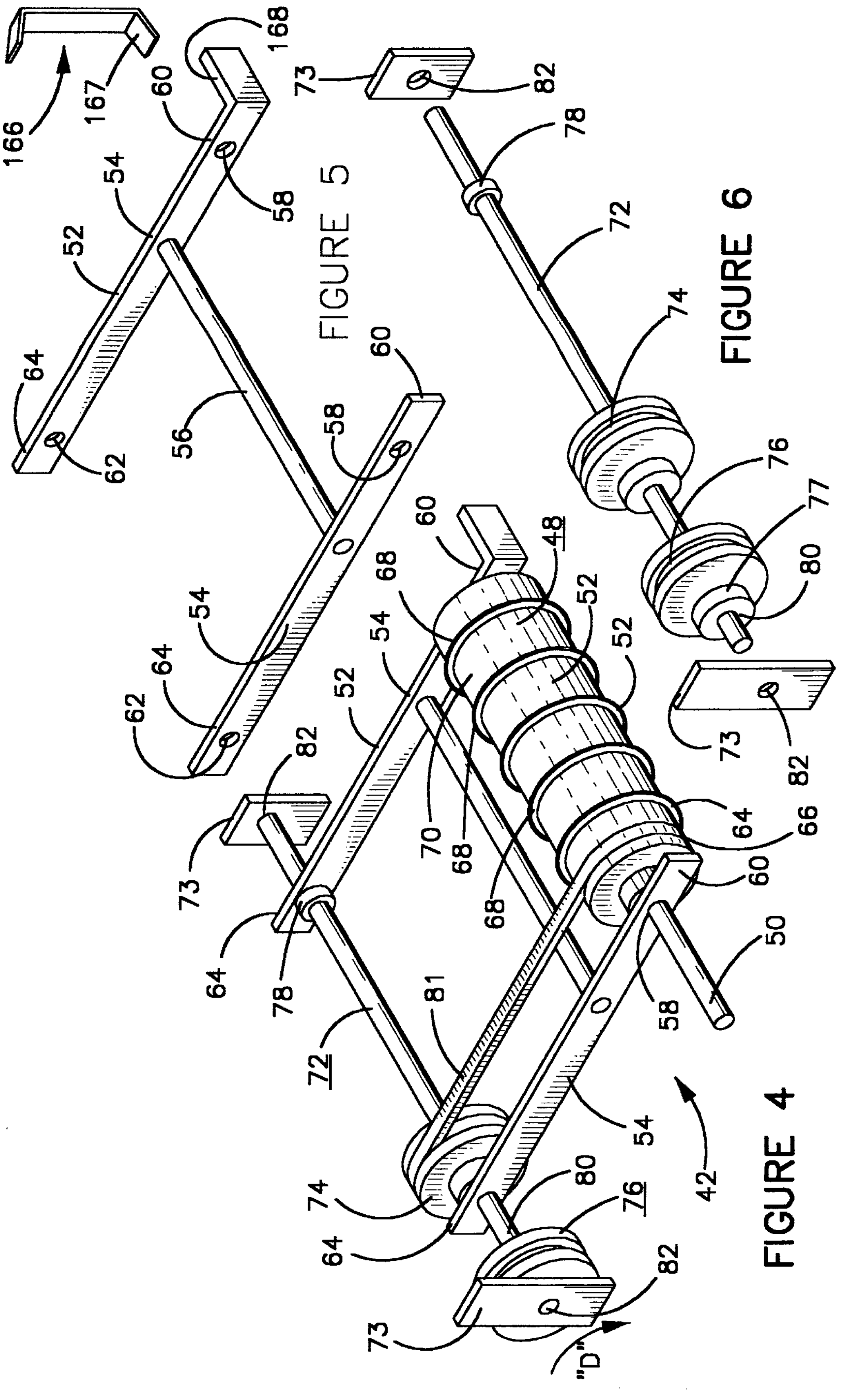
FIG. 4 is a perspective view of the feed assembly of the device of the present invention.
FIG. 5 is a perspective view of the bracket member of the feed assembly.
FIG. 6 is a perspective view of an embodiment of the drive axle.

In this embodiment of the conversion method, the feed assembly 42 provided, shown in isolation in FIG. 4, includes a cylindrically shaped roller member 48, and a bracket 52. Roller member 48 includes an axle 50, a first drive pulley 66 and five friction bands 68. First drive pulley 66 is located at one end of roller member 48. Friction bands 68 are spaced along and extend out past the cylindrical outer surface 70 of roller member 48. In use, the friction bands contact the surface of the top copy of the stack of newspapers placed on rack assembly 28.

FIG. 5 shows bracket 52 in isolation. In this embodiment, bracket 52 includes two rigid bars 54 connected at their centers by a rigid cross-member 56. Each rigid bar 54 has an axle aperture 58 at one end 60 and a pivot aperture 62 at the other end 64. Roller member 48 is rotatably connected to bracket 52 by installing the ends of axle 50 through the axle apertures 58.

The drive assembly 44 seen in FIG. 3 includes a unidirectional drive mechanism and a reset mechanism. FIG. 4 shows a drive axle 72 and two mounts 73 which comprise a portion of the unidirectional drive mechanism of drive assembly 44. Drive axle 72 is installed through the pivot apertures 62. Drive axle 72 is rotatable with respect to bracket 52. Drive axle 72 also includes a second drive pulley 74, a third drive pulley 76, and a spacer 78. Second drive pulley 74 and spacer 78 are rigidly attached to drive axle 72 and are positioned between and adjacent rigid bars 54. Roller member 48 is coupled to drive axle 72 through a first drive belt 81 installed between first drive pulley 66 and second drive pulley 74. Third drive pulley 76 has a hub 77 (shown in FIG. 6) that includes a one-way clutch-bearing assembly which allows third drive pulley 76 to freely rotate with respect to drive axle 72 in the direction shown by arrow "D" of FIG. 4, but firmly engages and rotates drive axle 72 in the opposite direction. In this embodiment, the hub 77 of third drive pulley 76 is positioned about a portion 80 of drive axle 72 that is not between rigid bars 54. One suitable one-way clutch-bearing assembly is a Single Rotation Bearing, Draw Cup Roller Clutch produced by Torrington Manufacturing of Torrington, Conn.

As shown in FIG. 6, each mount 73 includes a mounting aperture 82 into which an end of drive axle 72 may be inserted. Drive axle 72 is rotatable within mounting apertures 82. Mounts 73 are attached to the sidewalls of storage cavity 14 above the rack assembly 28 of the positioning assembly 26 during installation of the feed assembly 42 into the MAVM. By mounting bracket 52 in this manner, feed assembly 42 pivots within storage cavity 14 allowing roller member 48 to float on the top copy of the stack of newspapers as shown in FIGS. 3 and 3A.

FIG. 5 also illustrates how right rigid bar 54 of bracket 52 includes an arm extension 168. Arm extension 168 will cooperate with a catch mechanism 166 to insure that roller member 48 is not raised above the approximate height of dispensing chute 132 as suggested in FIG. 3. The catch mechanism 166 seen in FIG. 5 is a strip of spring steel or similar material which has upper and lower flanges 167 formed thereon. Catch mechanism 166 will be fixed to the interior side wall of cavity 12 as shown in phantom in FIG. 2. FIG. 3 also represents catch mechanism 166 in phantom because the side wall on which catch mechanism 166 is fix has been cut away in FIG. 3. Nevertheless, FIG. 3 illustrates how catch mechanism 166 will be positioned at a height such that when arm extension 168 engages the lower flange 167 of catch mechanism 168, roller member 48 is at a height approximate dispensing chute 132. Since lower flange 167 holds extension arm 168 in place, roller member 48 will resist the upward force caused by the springs 30 acting on rack assembly 28 (see FIG. 1). As mentioned, catch mechanism 166 will be constructed of spring steel or a similar material. Flanges 167 will be rigid enough to resist the upward force of rack assembly 28, but may also be flattened against the side wall of cavity 12 when necessary. When it is desired to place printed publications on rack assembly 28, lower flange 167 may be depressed against the side wall of cavity 12 and extension arm 168 raised above upper flange 167 and allowed to rest on upper flange 167 during the addition of the printed publications. After the addition of the printed publications, extension arm 168 is again positioned below lower flange 167.

Figure 7:
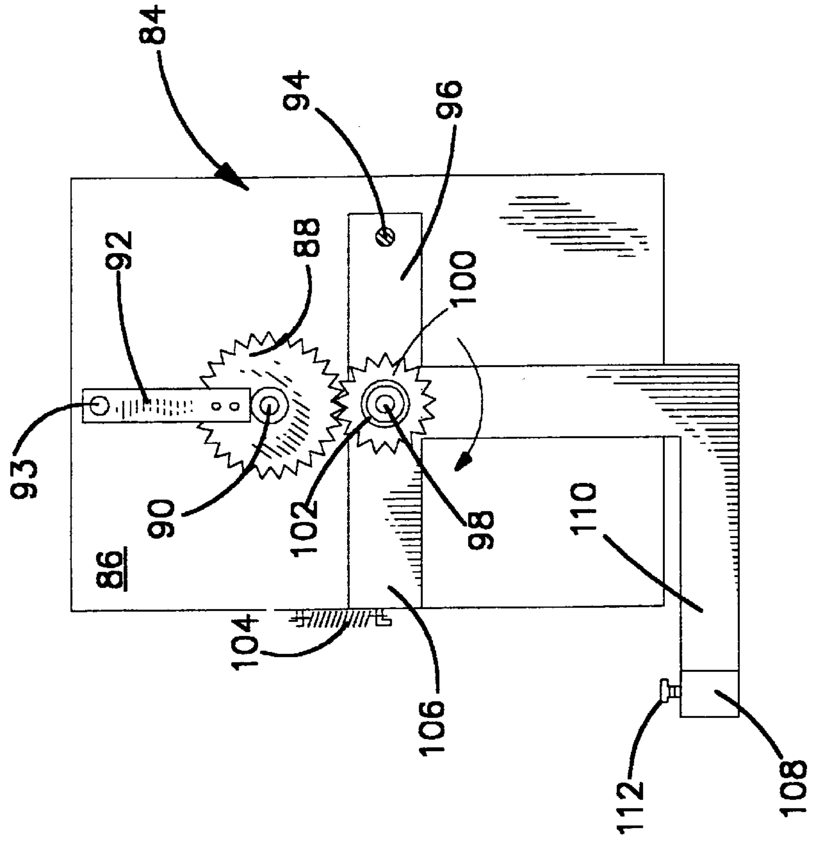
FIG. 7 is a side view of the unidirectional drive mechanism in the unidirectional mode.

FIG. 7 is a side view of a gearing mechanism 84 which comprises part of the unidirectional drive mechanism and part of the reset mechanism provided in this embodiment of the conversion method. Gearing mechanism 84 includes a mounting plate 86 having a first gear 88 which rotates freely in both directions about a first pin 90. First pin 90 is rigidly connected to mounting plate 86. Attached to first gear 88 is a gear lever 92 that includes a connecting pin 93 that extends outwardly from gear lever 92.

Also attached to mounting plate 86 is a second pin 94 upon which a J-shaped member 96 is pivotally mounted. J-shaped member 96 includes a third pin 98 upon which a second gear 100 is mounted. The hub 102 of second gear 100 includes a one-way clutch-bearing assembly that restricts rotation of second gear 100 to rotation about third pin 98 in one direction. This clutch-bearing assembly could also be a Single Rotation Bearing, Draw Cup Roller Clutch produced by Torrington Manufacturing of Torrington, Conn.

First gear 88 and second gear 100 are forced into meshing relationship by the force from a spring 104 connected between one end 106 of J-shaped member 96 and mounting plate 86. When first gear 88 and second gear 100 are meshed, the unidirectional rotation of second gear 100 restricts rotation of first gear 88 to a single direction.

Figure 8:
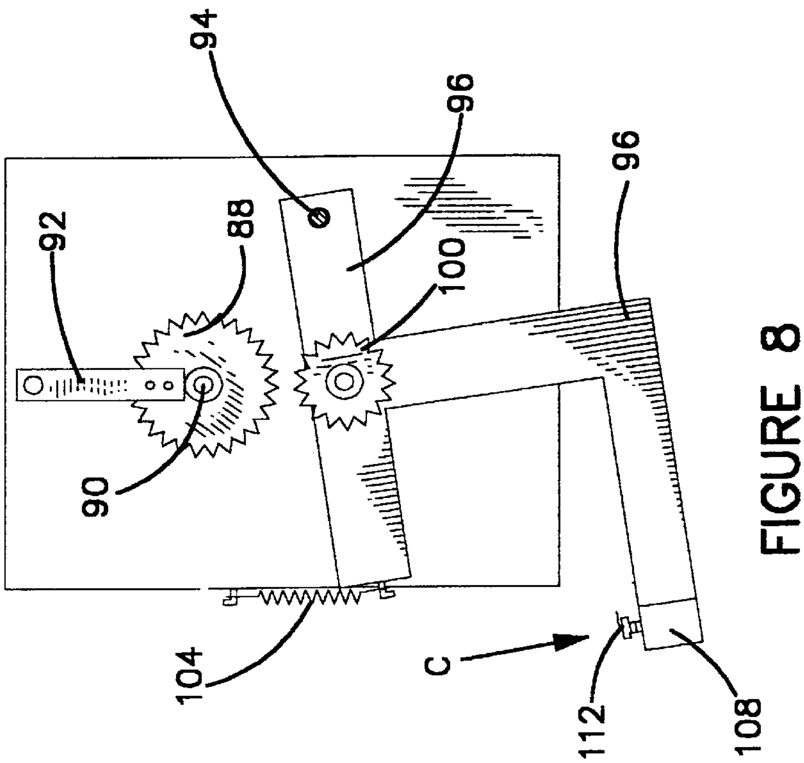
FIG. 8 is a side view of the unidirectional drive mechanism in the reset mode.

J-shaped member 96 also includes a cantilever portion 108 that extends outwardly from bottom section 110. Cantilever portion 108 includes a threaded contact pin 112. As shown in FIG. 8, a force acting against contact pin 112 in the direction shown by arrow "C" will cause J-shaped member 96 to pivot about second pin 94. When J-shaped member 96 pivots in this manner, second gear 100 is removed from meshed relationship with first gear 88 allowing first gear 88 to rotate freely in either direction.

Figure 9:
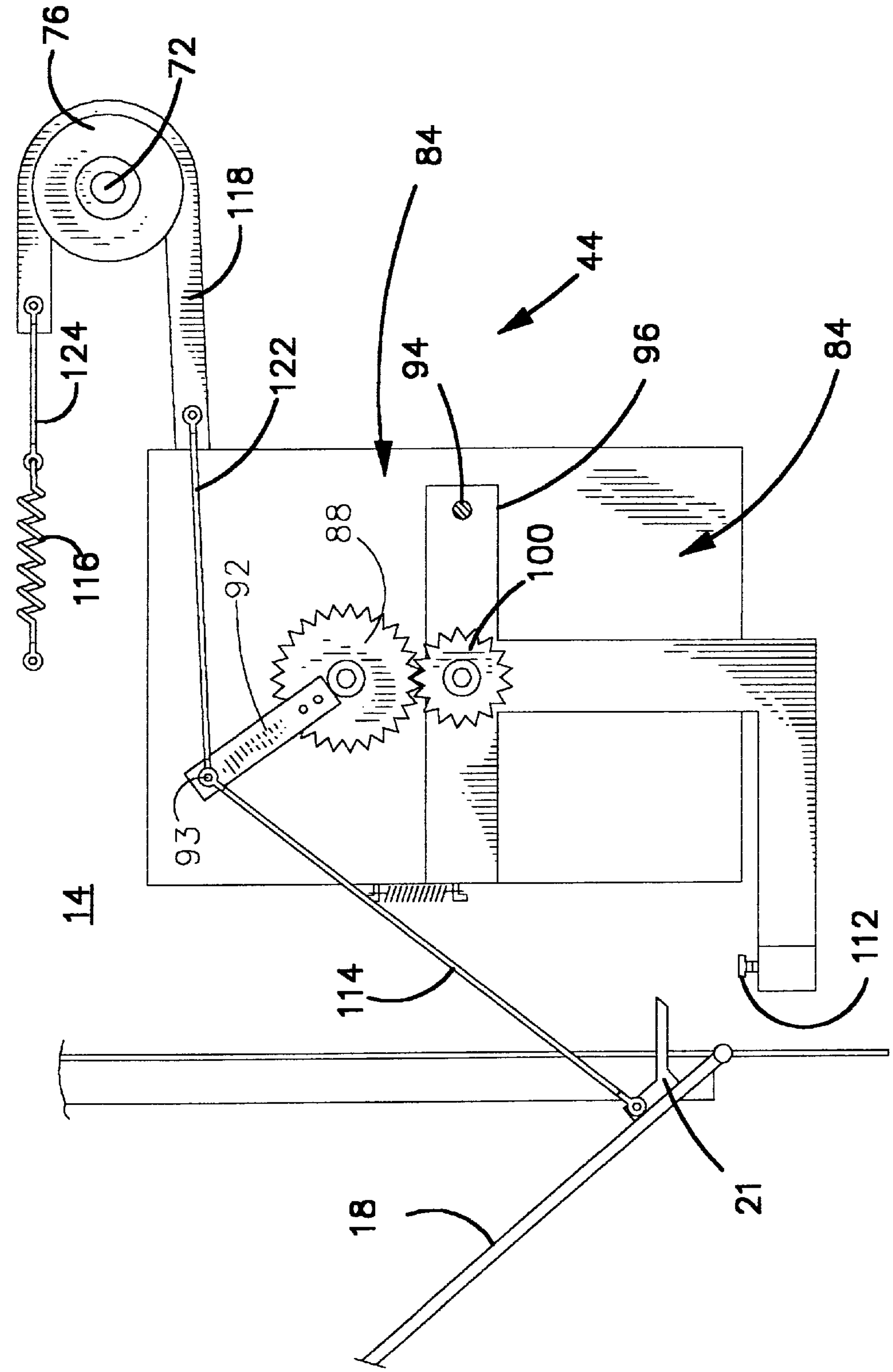
FIG. 9 is a schematic side view of the unidirectional drive mechanism and reset mechanism in the unidirectional mode.

FIG. 9 is a detail side-view that shows a preferred installation arrangement for the drive assembly 44. Shown in the Figure are unidirectional gearing mechanism 84, door member 18, third drive pulley 76, tension cable 114, reset spring 116, second drive belt 118, and drive belt connectors 122, 124. Installation of drive assembly 44 is accomplished by attaching gearing mechanism 84 to the side wall of storage cavity 14 at a location where door stop 21 can contact and move contact pin 112. Tension cable 114 is connected between door stop 21 and connecting pin 93, while drive belt connector 122 is connected to connecting pin 93. Second drive belt 118 is then looped over third drive pulley 76; drive belt connector 124 is attached to one end of reset spring 116; and finally, the other end of reset spring 116 is attached to the interior surface of storage cavity 14. Tension from reset spring 116 keeps second drive belt 118 biased against third drive pulley 76. The position of door member 18 at which the unidirectional drive mechanism is reset (i.e., gear 100 disengages gear 88) is then adjusted to a position located between a position where catch member 20 (see FIG. 1) has engaged hook member 22 but before door member 18 is fully closed. This is accomplished by adjusting the height of threaded contact pin 112 so that door stop 21 engages contact pin 112, causing gear 100 to disengage gear 88.

When door member 18 is closed, gear 100 is disengaged from gear 88. When door member 18 is opened, gear 100 and gear 88 engage, and tension from tension cable 114 causes first gear 88 to rotate in the direction allowed by second gear 100. Rotation of first gear 88 causes second drive belt 118 to rotate third drive pulley 76 in the direction which causes third drive pulley 76 to engage and rotate drive axle 72. Reset spring 116 expands as second drive belt 118 rotates third drive pulley 76. Allowing tension cable 114 to become slack, for example by partially closing door member 18, will not effect the position of first gear 88 because the clutch bearing of second gear 100 prevents first gear 88 from rotating in the direction urged by reset spring 116.

Figure 10:
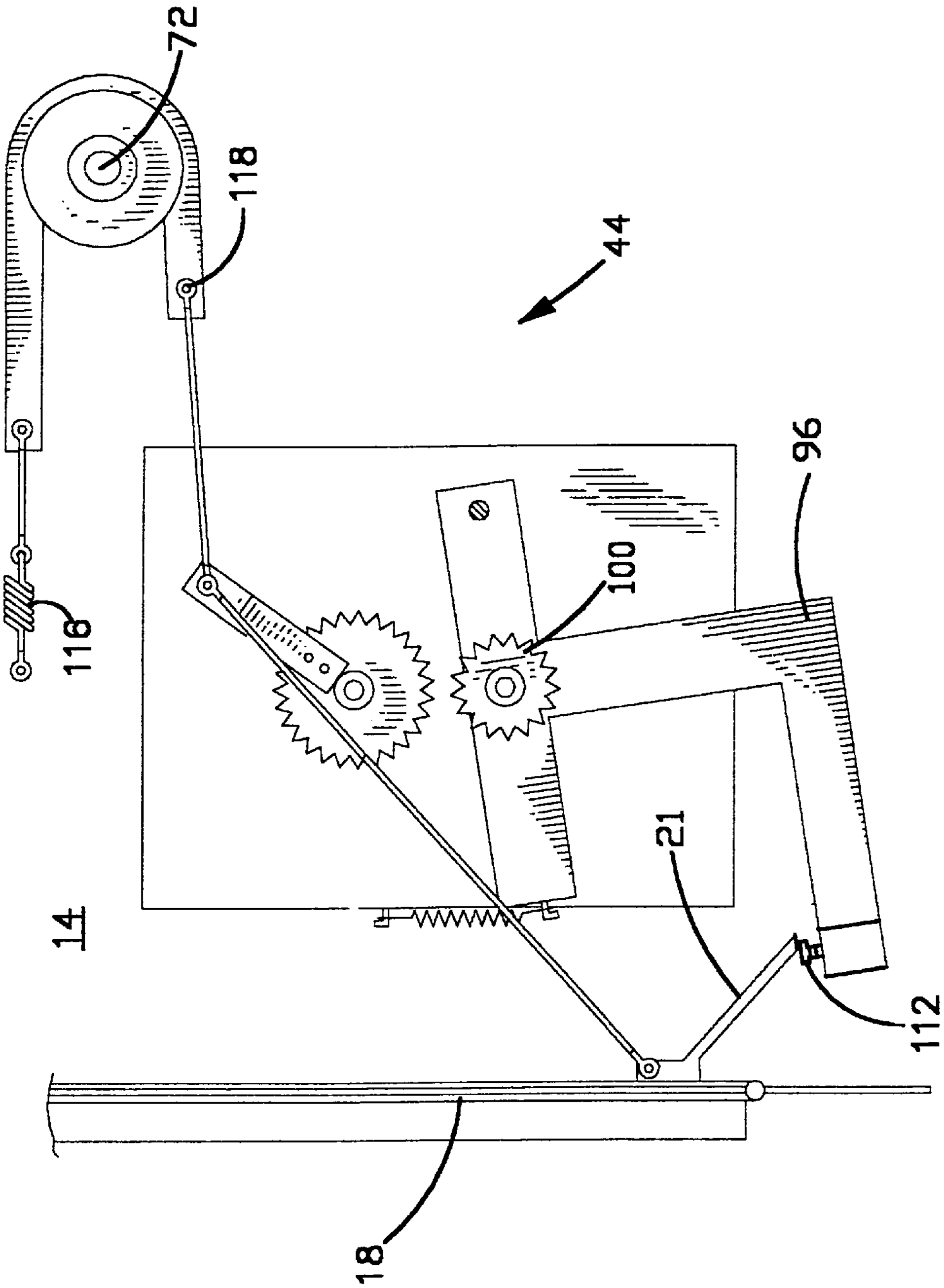
FIG. 10 is a schematic side view of the unidirectional drive mechanism and the reset mechanism in the reset mode.

FIG. 10 shows door member 18 in the completely closed position. When door member 18 is in this position, the unidirectional gearing mechanism 84 is reset. Contact between door stop 21 and threaded contact pin 112 forces J-shaped member 96 to pivot at second pin 94 and unmeshes first gear 88 and second gear 100. Without second gear 100 preventing first gear 88 from rotating in the direction urged by the expanded reset spring 116, first gear 88 rotates freely back to the position shown. In addition, because third drive pulley 76 also includes a one-way clutch bearing, third drive pulley 76 freely rotates in the direction urged by reset spring 116, and no rotation of drive axle 72 is caused by resetting the device.

Figure 11:
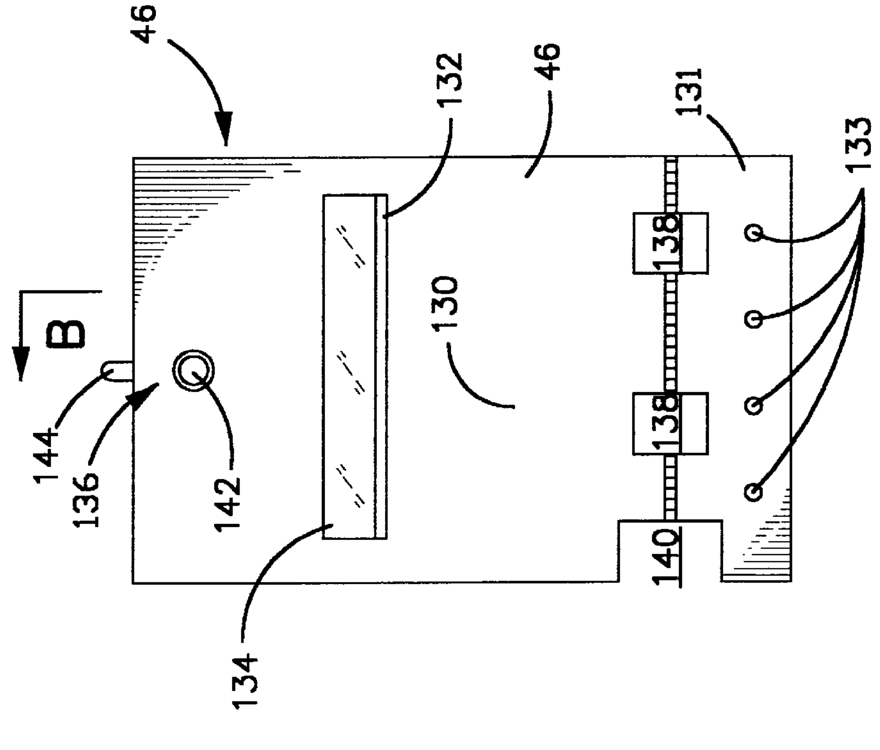
FIG. 11 is a front view of the plate member.

FIG. 11 is a frontal view of the plate member 46 provided in this embodiment of the conversion method. Shown is a cover plate 130, a hinged mounting plate 131, a dispensing chute 132, a locking assembly 136, door spring notches 138, and door-stop notch 140. While not shown, one preferred embodiment may include a door-stop flange shaped to cover and minimize access into storage cavity 14 through door-stop notch 140. Hinged mounting plate 131 includes four mounting holes 133. Dispensing chute 132 is positioned on cover plate 130 at a location that coincides with the predetermined location of the top copy of the stack of newspapers positioned on rack assembly 28. Locking assembly 136 includes a key lock 142 and an engagement tab 144.

Plate member 46 is installed over vending opening 16 by riveting hinged mounting plate 131 to the front interior surface of storage cavity 14 just beneath vending opening 16 in a manner to allow cover plate 130 to rotate into position over vending opening 16. The use of hinged mounting plate 131 allows cover plate 130 to rotate down and out of the way during loading of the device. Once the machine is loaded, cover plate 130 may be rotated into position and engagement tab 144 rotated into place behind an inner lip of housing 12 to secure cover plate 130 into position over vending opening 16. Spring notches 138 are sized and positioned to allow door member 18 to open and close unimpeded by plate member 46. Door-stop notch 140 is similarly sized and positioned.

Figure 13:
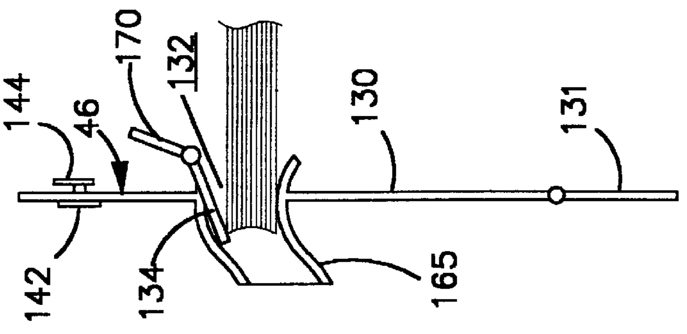
FIG. 13 is a cross-sectional view of the plate member shown in FIG. 11 along the line B—B showing the dispensing flap in the up or dispensing position and the engagement tab in the down or disengaged position.
Figure 12:
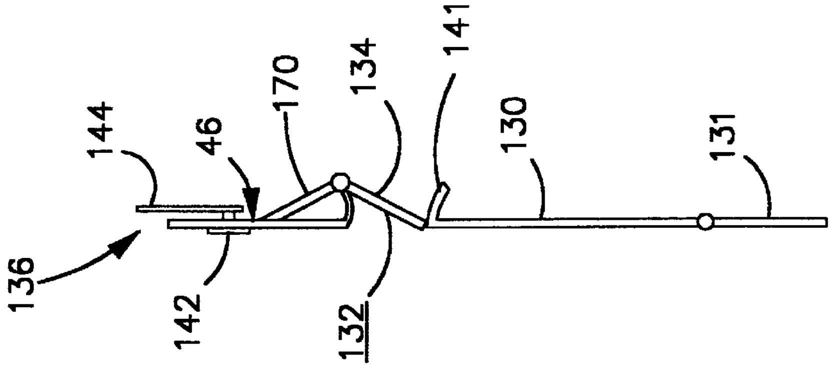
FIG. 12 is a cross-sectional view of the plate member shown in FIG. 11 along the line B—B showing the dispensing flap in the down or non-dispensing position and the engagement tab in the up or engaged position.

FIGS. 12 and 13 are cross-sectional side views of the plate member 46 shown in FIG. 11 along the line B—B. These views more clearly illustrate dispensing chute 132 and the engagement tab 144 of locking assembly 136. In addition, FIGS. 12 and 13 also show a hinged dispensing flap 134 and two feed guides 141. FIG. 12 shows hinged dispensing flap 134 in the down or non-dispensing position. FIG. 13 shows hinged dispensing flap 134 in the up or dispensing position with a representative newspaper being dispensed through dispensing chute 132. Dispensing flap 134 has an extension 170 which will prevent dispensing flap 134 from being pushed inward but will allow outward movement of dispensing flap 134. FIG. 12 shows engagement tab 144 in the up or engaged position. FIG. 13 also shows engagement tab 144 rotated into the down or disengaged position. Engagement tab 144 is placed in this position when plate member 46 is rotated down to load the vending machine during use. FIG. 13 also shows how an alternate embodiment of dispensing chute 132 could be equipped with a curved feed guard 165. Feed guard 165 is shaped to foil the insertion of a hand or other instrument through dispensing chute 132 in an attempt to pull printed publications from the stack without inserting the necessary coinage to activate the vending mechanism. Feed guard 132 will have short enough length that it does not interfere with the closing of door member 18.

Having discussed the conversion method, operation of the converted MAVM will now be discussed with reference to the illustrations of FIGS. 3 and 3A. FIG. 3 shows the converted device of the invention in the reset configuration. In this configuration, door stop 21 has contacted contact pin 112 pivoting second gear 100 out of meshed relationship with first gear 88. Because the direction of rotation of first gear 88 is not restricted by second gear 100, the force from contracting reset spring 116 has rotated first gear 88 into the position shown. Not previously discussed but shown in FIGS. 3 and 3A is a preferred anti-curl mechanism 148. Anti-curl mechanism includes an anti-curl plate 154 which is slidably mounted in a track 156. Anti-curl plate 154 rests on the heel portion 151 of the top copy 150 and prevents or minimizes curling of top copy 150 during operation of the device. One embodiment of the invention forms the lower surface of anti-curl plate 154 with a low-friction coating, such as teflon, in order to allow top copy 150 to more easily slide out of chute 132.

FIG. 3A shows the converted device of the invention approximately midway through a dispensing cycle. Friction bands 68 are in contact with the surface of top copy 150. Door member 18 is moving into the fully open position causing first gear 88 to rotate in the direction shown by arrow "F". Rotation of first gear 88 causes second drive belt 118 to move in the direction shown by arrow "G" which, in turn, causes third drive pulley 76 to rotate. Rotation of third drive pulley 76 in this direction causes the one-way clutch bearing of hub 77 to engage and rotate drive axle 72. Rotation of drive axle 72 causes second drive pulley 74 to also rotate in the direction shown by arrow "H". The rotation of second drive pulley 74 is transmitted to roller member 48 through first drive belt 81 causing roller member 48 to rotate in the direction indicated by arrow "I". Rotation of roller member 48 causes top copy 150 to be urged out of storage cavity 14 through dispensing chute 132 in the direction shown by arrow "J". The preferred embodiment seen in FIG. 3A illustrates inclined feed plate 160. The rear portion of feed plate 160 will be fixedly connected to rack assembly 28 by bolts 162, welding, or any other conventional means. The front portion of feed plate 160 will be adjustably connected to rack assembly 28 by height adjusting screws 164. Feed plate 160 will be constructed of a material, such as thin sheet metal, which is flexible enough to form an upward inclined plane when adjusting screws 164 are raised. Because the heel portion 151 (seen in FIG. 3A) of the printed publications is thicker than the opposite or front portion 152, the height of a stack of printed publications is greater on the side corresponding to heel portion 151 than on the side corresponding to front portion 152. This typically causes a stack of printed publications to be inclined somewhat downward from heel portion 151 to front portion 152. The upward inclined plane formed by feed plate 160 tends to compensate for this downward inclination and helps insure the front portion 152 of the printed publications is directed in a relatively level or horizontal orientation into dispensing chute 132 during operation of the invention.

Once a portion of top copy 150 has exited through dispensing chute 132, top copy 150 may be grasped by the customer and pulled completely out of storage cavity 14. Removal of top copy 150 will cause rack assembly 28 to move upward within storage cavity 14 bringing the next copy into alignment with a dispensing chute 132. Unidirectional gearing mechanism 84 is reset only after the catch member 20 of the door member 18 engages the hook member 22 of the coin mechanism 24 (not shown in the Figure). Resetting the device at this point in the door closing sequence ensures only one copy will be dispensed for each deposit of the predetermined amount of coins into the coin mechanism 24 (shown in FIG. 1).

The present invention also provides a method of dispensing an individual copy of a printed publication having a heel portion, from a stack containing a plurality of individual copies. The preferred method includes the following steps: a) providing a dispensing device of the type described hereinabove; b) providing a stack of printed publications having a heel portion; c) positioning the stack of printed publications onto the rack assembly of the dispensing device in a manner such that the heel portion is positioned away from the publication discharge portal of the dispensing device; d) positioning the anti-curl plate into contact with the heel portion of the top copy of the stack; and e) operating the drive assembly of the dispensing device in a manner such that the roller member of the dispensing device rotates in the direction that urges a top copy from the stack at least partially out of the storage cavity through the publication discharge portal. Applicants have found that by placing the heel portion of the printed publication opposite the dispensing chute, the printed publication (especially a newspaper) will more reliably exit the chute as a single unit rather than separating into various sections during the discharge cycle.

It can be seen from the preceding description that a device and method for dispensing single copies of a printed publication from a stack containing multiple copies of the publication and a method of converting multiple access vending machines into single access devices has been provided.

It is noted that the particular embodiments of the methods and devices described herein in detail for exemplary purposes are of course subject to many different variations in structure, design, and application. In particular it may be desirable in some circumstances to add additional weight to the rack plate of the positioning assembly and/or adjust the spring tension in order to achieve more accurate positioning of the top copy. Also, it has been found that the addition of a compartment to the existing door member in order to display the current days headline may be advantageous in a commercial embodiment. In addition, fluorescent tape or paint may be applied to various components of the device, such as on the roller member, in order to aid persons filling the vending device in the pre-dawn darkness or in dark locations. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A method for converting a multiple access printed publication dispensing device that comprises:

a. a housing having a cavity in connection with a dispensing opening;

b. a door member pivotally attached to said housing in a manner to selectively allow access to said cavity through said dispensing opening; and c. a positioning assembly within said cavity having a rack assembly supported by a biasing means for supporting a stack of said printed publications in a manner such that a top copy of said stack is positioned into substantially the same position within said cavity as each successive top copy is removed;

into a dispensing device which allows access to only one of said copies in said stack at a time, said method comprising the steps of:

i. providing a feed assembly comprising:
   a bracket, and
   a roller member rotatably mounted to said bracket;

ii. providing a drive assembly comprising:
   a unidirectional drive mechanism having a first and second gear member with meashable teeth, said second gear member only turning in one direction, and
   a reset mechanism;

iii. providing a plate member having a publication discharge portal having dimensions sufficient to allow discharge therethrough of a single copy of said printed publication;

iv. installing said feed assembly within said cavity above said rack assembly in a manner such that said roller member engages said top copy of said stack of printed publications;

v. installing said drive assembly within said cavity;

vi. installing said plate member across said dispensing opening in a manner such that said discharge portal is aligned with said top copy of said stack and said pivoting door member is operable to seal access to said discharge portal;

vii. installing a flexible member with a first end connected to said unidirectional drive mechanism and a second end connected to said pivoting door member; and viii. linking said unidirectional drive mechanism to said feed assembly.

2. The method of claim 1 wherein said reset mechanism is adjusted to reset said unidirectional drive mechanism when said pivoting door member is closed.

3. The method of claim 1 wherein said feed assembly is installed within said cavity above said rack assembly in a manner such that said bracket pivots within said cavity and said roller member floats on said top copy.

4. The method of claim 1 wherein said first end of said flexible member is in mechanical connection with one of said gear members in a manner to cause both of said gear members to rotate when said flexible member is under tensional force.

5. The method of claim 1 wherein said reset mechanism includes a biasing means for biasing said meshable teeth of said first and second gear members into a normally meshed relationship and a lever means, in mechanical linkage with one of said gear members, for overcoming said biasing means and forcing said meshable teeth of said first and second gear members out of said normally meshed relationship.

6. The method of claim 5 wherein said reset mechanism further includes a rewind mechanism operationally linked to said first gear member for causing said first gear member to return to a predetermined reset position when said meshable teeth of said first and second gear members are force out of said normally meshed relationship.

7. The method of claim 6 wherein said rewind mechanism includes a spring.

8. The method of claim 1 further including the steps of providing an anti-curl device positioned to contact a heel of said top copy and thereby preventing said top copy from curling in response to the rotation of said roller member when said roller member is urging said top copy toward said discharge portal.

9. A dispensing device for dispensing individual copies of a printed publication from a stack, said dispensing device comprising:

a. a housing having a cavity with an opening of sufficient size to allow placement of a stack of printed publications within said cavity;

b. a door member attached to said housing in a manner to selectively allow access to said cavity through said opening;

c. a positioning assembly within said cavity having a rack assembly supported by a biasing device whereby a stack of said printed publications is supported in a manner such that a top copy of said stack is positioned into a predetermined position within said cavity as each successive top copy is removed;

d. a feed assembly comprising a bracket and a roller member within said cavity, said roller member being rotatably mounted to said bracket and positioned such that said roller member contacts said top copy of said printed publication;

e. a drive assembly comprising a unidirectional drive mechanism and a reset mechanism, said unidirectional drive mechanism being in mechanical connection with said roller member, said reset mechanism being in mechanical connection with said unidirectional drive mechanism; and f. a plate member connected said housing and having a publication discharge portal in alignment with said predetermined position of said top copy, said discharge portal having dimensions sufficient to allow discharge therethrough of a single copy of said printed publication;

g. said feed assembly being mounted within said cavity above said rack assembly and being aligned in a manner such that said roller member urges said top copy toward said discharge portal when rotated in a first direction; and e. an anti-curl device in contact with said top copy, thereby preventing said top copy from curling in response to the rotation of said roller member when said roller member is urging said top copy toward said discharge portal.

10. The device of claim 9 wherein said unidirectional drive mechanism comprises a first and second gear member, one of said gear members turning in only one direction.

11. The device of claim 9, wherein said anti-curl device is slidably mounted to a track mounted within said cavity.

12. The device of claim 9, wherein said rack assembly includes an upwardly inclined feed plate.

13. The device of claim 9, further including a flexible member with a first end connected to said unidirectional drive mechanism and a second end connected to said pivoting door member.

14. A method for converting a multiple access printed publication dispensing device that comprises:

a. a housing having a cavity with a dispensing opening;

b. a door member pivotally attached to said housing in a manner to selectively allow access to said cavity through said dispensing opening;

c. a positioning assembly within said cavity having a rack assembly which is resiliently supported such that a top copy of said stack is positioned in substantially the same position within said cavity as each successive top copy is removed; and d. an anti-curl device positioned to contact a heel portion of said top copy of said stack;

into a dispensing device which allows access to only one of said copies in said stack at a time, said method comprising the steps of:

i. providing a feed assembly having a bracket and a roller member rotatably mounted to said bracket;

ii. providing a drive assembly having a unidirectional drive mechanism and a reset mechanism;

iii. providing a plate member having a publication discharge portal with dimensions sufficient to allow discharge therethrough of a single copy of said printed publication;

iv. installing said feed assembly within said cavity above said rack assembly in a manner such that said roller member engages said top copy of said stack of printed publications;

v. operably connecting said unidirectional drive mechanism to said feed assembly;

vi. operably connecting said unidirectional drive mechanism to said pivoting door member; and vii. installing said plate member across said dispensing opening in a manner such that said discharge portal is aligned with said top copy of said stack and said pivoting door member is operable to seal access to said discharge portal.

15. The method according to claim 14, wherein said rack assembly includes an upwardly inclined feed plate.

16. The method according to claim 14, wherein said unidirectional drive mechanism and said pivoting door member are mechanically connected by a flexible member with a first end attached to said unidirectional drive mechanism and a second end attached to said pivoting door member.

* * * * *